United States Patent Office.

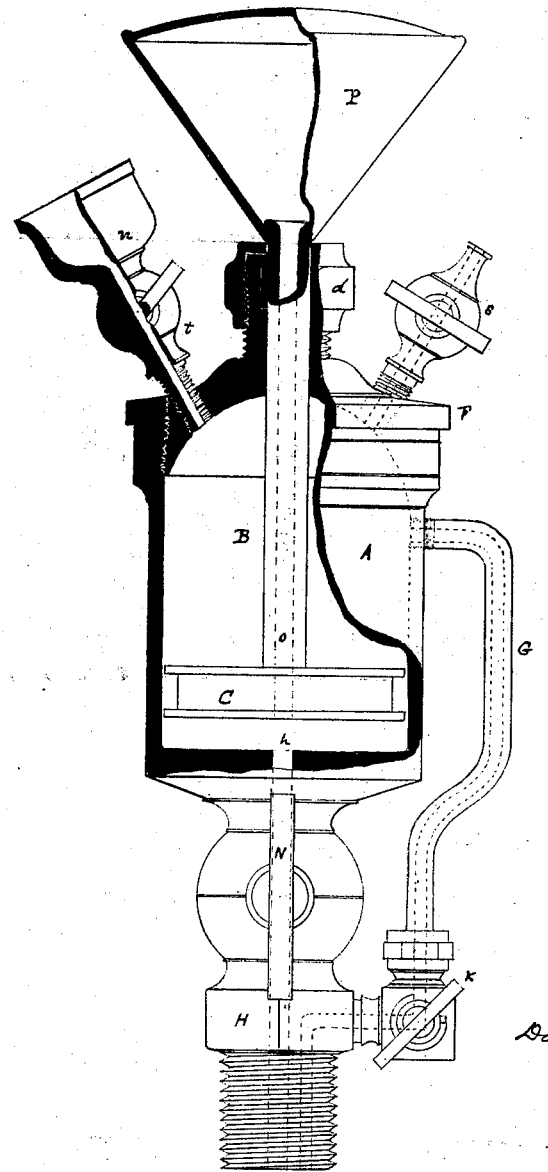

DANIEL CURRIE, OF BELLEVILLE, ILLINOIS.

Letters Patent No. 111,110, dated January 24, 1871.

IMPROVEMENT IN STEAM-LUBRICATORS.

The Schedule referred to in these Letters Patent and making part of the same.

*To all whom it may concern:*

Be it known that I, DANIEL CURRIE, of Bellevile, St. Clair county, State of Illinois, have invented a new and useful improved Oil-Cup, of which the following is a full, clear, and exact description, reference being had to the annexed drawing making part of this specification, and representing a side elevation of same, with a portion in section.

My invention is an improvement on the oil-cup for which I made application for Letters Patent on the 22d day of April, A. D. 1870, which application was allowed on the 27th day of May, A. D. 1870; and the object I have in view is to do away with the spring and lever attached to the piston-rod in that apparatus for the purpose of counterbalancing the pressure of the steam on the top of the piston.

The cup A is constructed in the same way, having an escape-pipe, *s*, and supply-pipe *t*, with a cup, *n*, on its extremity.

It has the same tube G leading from near its top down to and connecting with the standard H, this latter being perforated by a tube, *h*, which opens into the bottom of the oil-cup, and is opened and closed by the cock N, which also, as in the other apparatus, affords a vent to another tube, not shown, leading from the bottom of the cup, for the purpose of allowing the steam in the cup to escape when the piston is forced down, so that the cup may receive a new supply of oil.

The piston-rod B passes through a steam-tight stuffing-box, *d*, and has attached to its upper end a funnel-shaped cup, P.

The rod is hollow, and its tube *o* opens at one end into the cup A, below the piston C, and at the other into the cup P, thus allowing the steam entering the cup A to act upon both the under side of the piston and also upon the interior of the cup P. This, as is evident, gives to the steam a much greater surface to act upon in its upward movement than it can possibly have when acting in the opposite direction, and therefore the pressure of any steam upon the top of the piston will be more than counterbalanced by the pressure on the under side of the piston and on the cup P, thus insuring a continual upward movement of the piston without the interposition of any springs or levers as counterpoises, as required in the former apparatus invented by me.

The funnel-shape of the cup P lessens greatly, and downward pressure of the steam entering it, the lubricating substance is fed through the tube *t*, and then the steam being turned on by the cock N, the oil or other lubricating substance passes down the tube G, as in the former apparatus invented by me.

What I claim as my invention, and desire to secure by Letters Patent, is—

1. The combination of the cup A piston C, hollow piston-rod B, and cup P, as and for the purpose shown and specified.

2. The combination of the cups A and P, piston C, hollow piston-rod B, and tubes G and *h*, as and for the purpose shown and specified.

DANIEL CURRIE.

Witnesses:
 MICL. K. CARROLL,
 JOSEPH YOUNG.